April 8, 1969 J. W. FLEMING 3,436,956
APPARATUS FOR DETERMINING FREEZING POINTS
Filed Oct. 22, 1965 Sheet 1 of 4
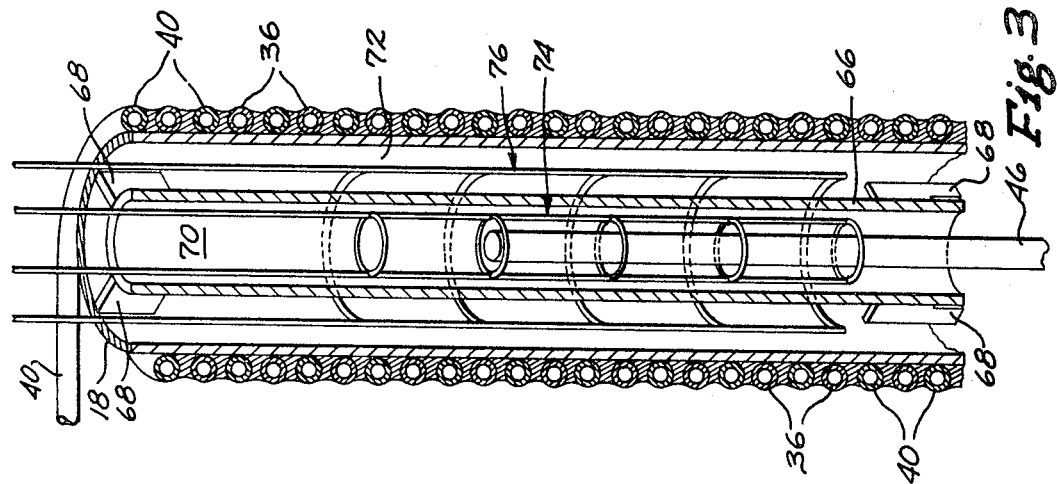
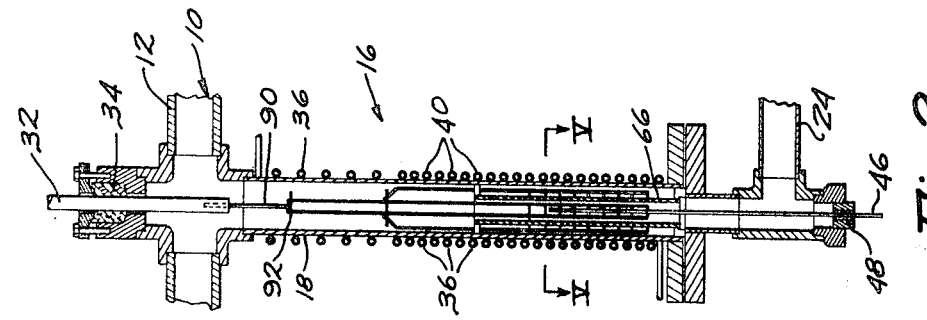
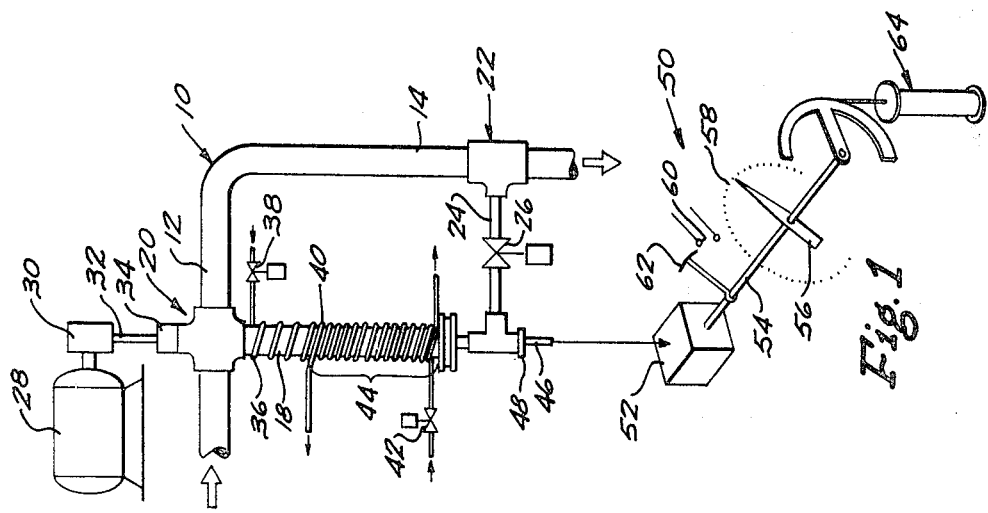
INVENTOR.
JOSEPH W. FLEMING
BY
ATTORNEY April 8, 1969   J. W. FLEMING   3,436,956
APPARATUS FOR DETERMINING FREEZING POINTS
Filed Oct. 22, 1965   Sheet 2 of 4

INVENTOR.
JOSEPH W. FLEMING
BY
ATTORNEY

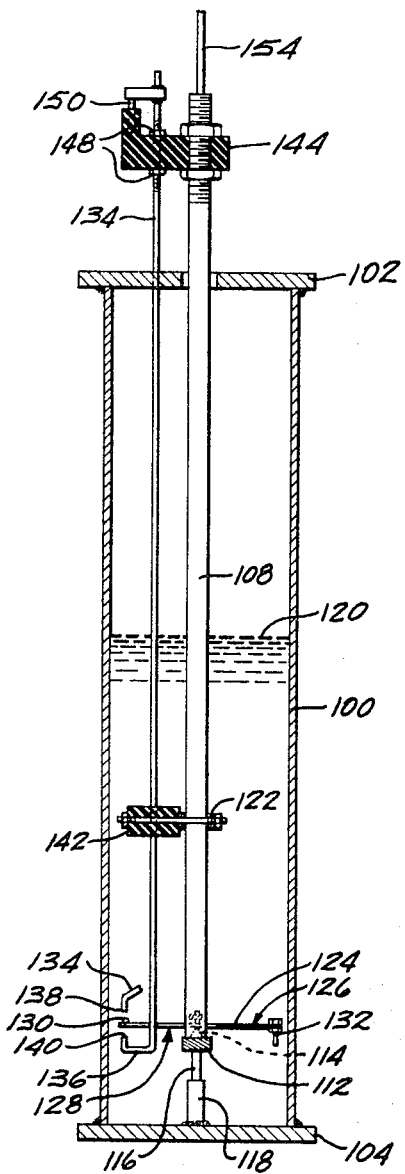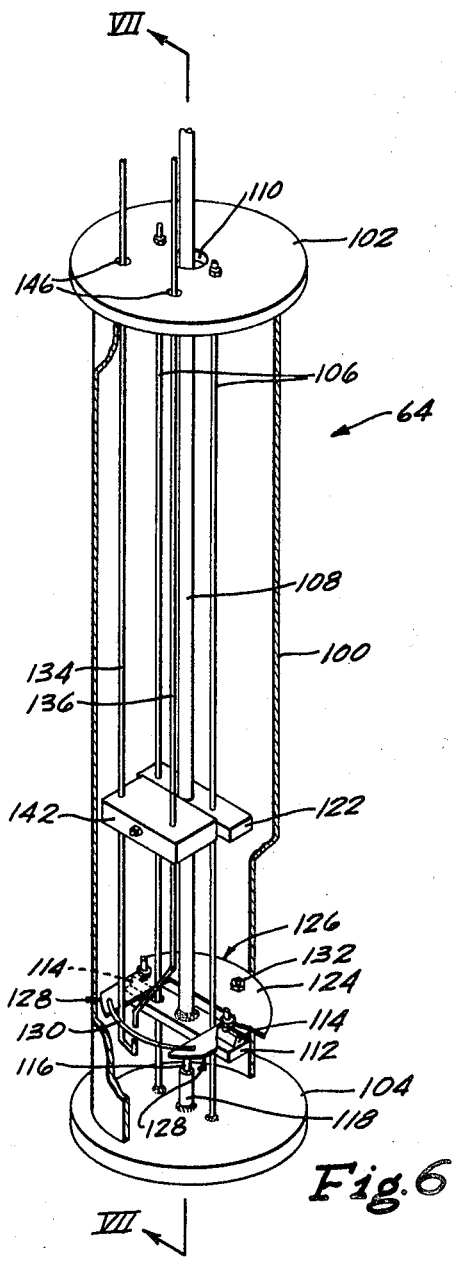
Fig. 7
Fig. 6

United States Patent Office 3,436,956
Patented Apr. 8, 1969

3,436,956
APPARATUS FOR DETERMINING FREEZING POINTS
Joseph W. Fleming, 110 Center St., West Newton, Pa. 15089
Filed Oct. 22, 1965, Ser. No. 501,263
Int. Cl. G01n 25/02
U.S. Cl. 73—17
8 Claims

ABSTRACT OF THE DISCLOSURE

Described is apparatus for determining the freezing points of liquid mixtures including a vessel having a first chamber and a second chamber adjacent each other, means for introducing a quantity of the liquid mixture whose freezing point is to be determined into both of the first and second chambers, means for measuring the temperature of the liquid mixture portion in the first chamber, and means for cooling said quantity of liquid mixture to its freezing point by extraction of heat directly from the liquid mixture portion in the second chamber whereby heat from the liquid mixture portion in the first chamber flows through the liquid mixture portion in the second chamber.

---

This invention relates to the determination of freezing points and apparatus therefor. More particularly, the present invention relates to an apparatus for determining the freezing points of liquid mixture batches in a rapid, automatic and continuous manner.

As is known, the freezing point of liquid mixtures can be used to determine their purity, concentration and certain of their physical properties. Consequently, a great number of chemicals are sold according to their freezing point. Furthermore, a large number of processing operations depend on the freezing point of the processed material as a control variable as well as a quality control indicator.

Apparatus is known in the prior art which is capable of continuously measuring the freezing point of flowing liquid mixtures. One such apparatus provides a somewhat continuous indication of the freezing point of the flowing liquid. This apparatus requires continuous and rather close watching since in operation, an equilibrium condition is established between a solid phase and a liquid phase of the liquid whose freezing point is being determined. To rapidly establish these equilibrium conditions, knowledge of the approximate freezing point of the flowing liquid should be known. Still further, to maintain the equilibrium conditions, the temperature in the freezing zone wherein the solid phase resides as well as the temperature in the heating zone wherein the liquid phase resides must be accurately controlled at all times. As should be evident, any number of things can happen to upset the equilibrium conditions. For example, if the temperature or the concentration of the flowing liquid changes, the previously-established equilibrium conditions are upset. Consequently, such apparatus cannot be used to determine the freezing point of high purity materials.

Batch-type devices for determining the freezing point of liquid mixtures, are also known to the prior art. However, these devices cannot be readily adapted for automatically determining the freezing points of liquid mixtures flowing in a process line.

Accordingly, as an overall object, the present invention seeks to provide apparatus for determining the freezing point of liquid mixtures.

Another object of the invention is to provide apparatus for determining the freezing point of a liquid mixture, which apparatus operates in a rapid, automatic and continuous manner.

A further object of the invention is to provide apparatus for determining the freezing point of liquid mixtures, which apparatus is not affected by the temperature or the concentration of the liquid mixture.

Still another object of the invention is to provide apparatus which may be connected to a process line for determining the freezing point of the liquid mixture flowing through said process line.

A further object of the invention is to provide apparatus which determines the freezing point of a liquid mixture by measuring the rate of temperature change during freezing of the liquid mixture.

Still another object of the invention is to provide a novel rate of change limit device which may be used, for example, in determining the freezing point of liquid mixtures.

In accordance with the present invention, apparatus is provided for determining the freezing points of liquid mixtures in a rapid, automatic and continuous manner. The apparatus of the invention comprises a housing which is compartmented so as to provide an inner chamber and an outer chamber which surrounds the inner chamber. The liquid mixture is introduced into the inner and outer chambers and is rapidly cooled to its freezing point by cooling means engaged with the outer surface of the housing. The overall arrangement is such that heat is extracted directly from the outer liquid portion. Consequently, as the liquid mixture cools, the outer liquid mixture portion will freeze first and thereby cause a reduction in the heat transfer rate and hence the cooling rate of the inner liquid mixture portion. Therefore, the inner liquid mixture portion freezes at a slower rate and after the freezing of the outer liquid mixture portion.

During cooling, the inner and outer liquid mixture portions are independently agitated so as to increase the heat transfer rate. The agitating mechanism is such that agitation stops as each of the liquid mixture portions freezes.

A temperature probe is provided for measuring the temperature of the inner liquid mixture portion. The temperature probe may comprise, for example, a thermocouple, a thermistor, or any other suitable temperature measuring element which is capable of connection to a temperature recorder or indicator-recorder. A rate sensing mechanism is operatively connected to the temperature probe by way of the temperature recording and/or indicating device. The rate sensing mechanism senses the rate of change in the decreasing temperature of the inner liquid mixture portion. As the temperature of the inner liquid mixture portion approaches the freezing temperature, the rate of temperature change will decrease in value. The rate sensing mechanism is such that when the rate of temperature change falls below a preselected low rate of change, the cooling means is stopped. The preselected low rate of change in the temperature of the inner liquid mixture portion is such that the actual temperature of the inner liquid mixture portion is substantially equal to the freezing point of the liquid mixture. Consequently, when the cooling means is stopped, the temperature of the inner liquid mixture portion will stabilize at the freezing point thereof.

The apparatus of the present invention may be incorporated into a process line whereby batch samples of the flowing liquid mixture may be introduced into the inner and outer chambers for the purpose of determining its freezing point. Although the system of the present invention operates in a batchwise manner, its operation, as will be explained, is a continuous one whereby batch samples of the flowing liquid mixture are continuously subjected to determination of their freezing point. When the apparatus of the present invention is incorporated into a process line, it is preferred to provide means for heating the sample to a preselected elevated temperature. This is necessary to insure that no solid material, that is, frozen liquid mixture, remains in either of the inner or outer chambers.

The above and other objects and advantages of the present invention will become apparent from the following detailed description by reference to the accompanying drawings, in which:

FIGURE 1 is a fragmentary side view of a process line provided with the freeze point determining apparatus of the invention;

FIG. 2 is a cross-sectional view, taken in the plane of FIG. 1, illustrating the internal construction of the freeze point determining apparatus;

FIG. 3 is an enlarged isometric view, in cross section, illustrating an inner chamber and an annular chamber of the freeze point determining apparatus;

FIG. 6 is an isometric view of a rate of change limit device;

FIG. 7 is a cross-sectional view taken along the line VII—VII of FIG. 6;

*General description*

Figure 5:
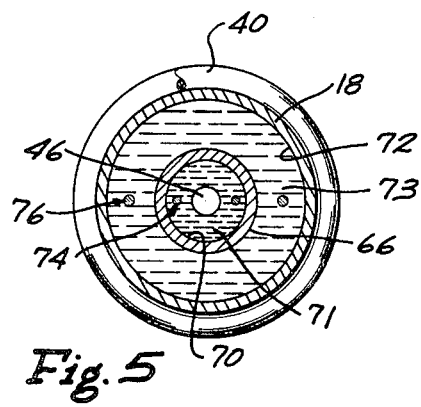
FIG. 5 is a cross-sectional view taken along the line V—V of FIG. 2.
Figure 8:
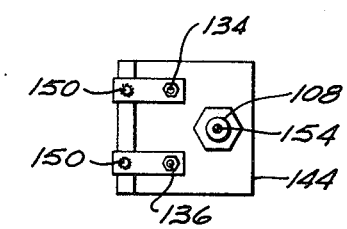
FIG. 8 is a plan view of an upper alignment block used in the rate of change limit device.

Referring to FIG. 1, there is illustrated a process pipe 10 through which flows a liquid mixture whose freezing point is to be determined. Although not absolutely necessary, the process pipe 10 comprises a generally horizontal section 12 and a generally vertical section 14. The liquid mixture flows through the horizontal section 12 and down the vertical section 14 as indicated by the arrows. It is to be understood that the process pipe 10 could, instead, be a straight section which is positioned vertically or horizontally or have any other configuration or orientation.

Connected into the process pipe 10 is a freeze point determining apparatus 16 of the invention. The apparatus 16 comprises a generally vertical conduit 18 communicating with the interior of the pipe 10 at an upstream location indicated at 20 and a downstream location indicated at 22 by means of a pipe section 24. A valve 26, preferably of the solenoid-operated type, is provided in the pipe section 24 for controlling the flow of liquid mixture through the conduit 18. It is, of course, understood that some means, such as an orifice in the vertical section 14, will be provided to cause the liquid mixture or a portion thereof to flow into the conduit 18 when the valve 26 is open.

A motor 28 drives a cam mechanism, schematically illustrated at 30, which, in turn, is connected to an agitator shaft 32 extending into the interior of the conduit 18 through a packing gland 34. The cam mechanism 30 imparts reciprocating motion to the agitator shaft 32 which, in turn, reciprocates an agitator (not shown) within the conduit 18.

The conduit 18 is provided with a steam coil 36 having a steam control valve 38 and a coolant coil 40 having a coolant control valve 42. The steam coil 36 extends substantially the full length of the conduit 18 and conveys steam thereto for heating the liquid mixture within the conduit 18. The coolant coil 40, on the other hand, extends only along a length of the conduit 18, indicated by the bracket 44. The length 44 comprises the freezing section of the apparatus 16. To insure good heat transfer between the coils 36 and 40 and the conduit 18, the coils 36 and 40 may be secured to the conduit 18 by means of soldering, brazing, welding or cementing. It is to be understood, at this time, that the coils 36 and 40 are but one example of apparatus by which the liquid mixture may be heated and cooled, and that any other suitable apparatus may be employed.

A temperature probe 46 projects into the interior of the conduit 18 through a packing gland 48 disposed adjacent the bottom of the conduit 18. The temperature probe 46 may comprise, for example, a thermocouple, a thermistor or any other suitable temperature sensing element. The temperature probe 46 must, however, be capable of transmitting a signal proportional to the temperature sensed, to a temperature indicating device, such as that illustrated at 50 and a temperature recording device such as that illustrated at 51. It is to be understood that the devices 50 and 51 could comprise a convenional indicating-recording unit but are shown here as separate units to facilitate description of the invention.

The device 50 preferably incorporates a conventional drive mechanism 52 which rotates a shaft 54 in response to the temperature sensed by the probe 46. As is conventional, a pointer 56 is secured to the shaft 54 and cooperates with a scale 58 to indicate the temperature sensed by the probe 46. The drive mechanism 52 also incorporates a temperature limit mechanism comprising, for example, a pair of contacts 60 and a wiper 62. The wiper 62 is secured to the shaft 54 and is positioned to engage the contacts 60 at a preselected elevated temperature. The preselected elevated temperature may be adjusted to any desired value, for example, by adjusting the angular relation of the wiper 62 with respect to the pointer 56. As will be described, the contacts 60 and the wiper 62 control the operation of the outlet valve 26, the motor 28 and the steam control valve 38, as well as opening the coolant control valve 42.

Also coupled to and operated by the shaft 54 is a rate of change limit device 64. As will be described, the rate of change limit device 64 is capable of limiting the rate of change of a variable which, in this instance, comprises the temperature of the liquid mixture within the conduit 18. As will also be described, the device 64 closes the coolant control valve 42 at a predetermined time in the operation of the apparatus 16.

*Freeze point determining apparatus 16*

Figure 4:
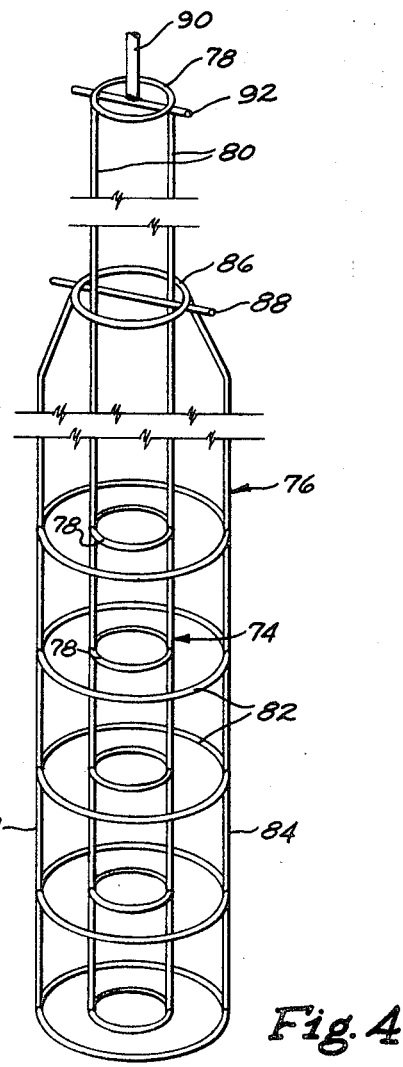
FIG. 4 is an isometric view of an agitator employed in the freeze point determining apparatus.

Reference is now directed to FIGS. 2, 3 and 4 for a more complete description of the freeze point determining apparatus 16. As can best be seen in FIGS. 2 and 3, a conduit segment 66 having an outer diameter which is less than the inner diameter of the conduit 18, is disposed within the bottom portion of the conduit 18. The conduit segment 66 is provided with aligning fins 68 at both of its ends, which serve to maintain the conduit segment 66 disposed centrally within the conduit 18. Consequently, the conduit 18 and the conduit segment 66 cooperate to provide an inner chamber 70 which is surrounded by an annular chamber 72. When the liquid mixture from the process pipe 10 is permitted to flow into the conduit 18, it will be divided into an inner liquid mixture portion 71 residing in the inner chamber 70 and an outer liquid mixture portion 73 residing in the annular chamber 72. These portions will be separated by the conduit segment 66. The temperature probe 46 extends up into the inner chamber 70 and therefore will measure the temperature of the inner liquid mixture portion 71.

As is known, agitation of any liquid enhances heat transfer therethrough. Accordingly, agitator means is provided for independently agitating the inner and outer liquid mixture portions 71, 73, respectively. The agitator means comprises an inner agitator cage 74 which extends into the inner chamber 70 and an outer agitator cage 76 which extends into the annular chamber 72. As can best be seen in FIG. 4, the inner agitator cage 74 is formed from a plurality of rings 78 which are connected together by means of stringers 80. Similarly, the outer agitator cage 76 is formed from a plurality of rings 82 which are secured together by means of stringers 84. The outer agitator cage 76, however, has an upper ring 86 which rests on a rod 88 secured transversely across the stringers 80 of the inner agitator cage 74. Consequently, the outer agitator cage 76 is loosely connected to the inner agitator cage 74 and may be reciprocated thereby. However, as will be described, the outer agitator cage 76 may be held stationary while the inner agitator cage 74 continues its reciprocating motion.

Referring now to FIGS. 2 and 4, the agitator shaft 32 is provided with an extension 90 having a rod 92 secured transversely of its end. The uppermost ring 78 of the inner agitator cage 74 rests on the rod 92 whereby the inner agitator cage 74 as well as the outer agitator cage 76 are suspended from the extension 90. It should be evident, that as the agitator shaft 32 is reciprocated, the inner and outer agitator cages 74, 76 will likewise be agitated therewith. However, it will be noted that as in the case of the outer agitator cage 76, the inner agitator cage 74 may also be held stationary while the agitator shaft 32 continues its reciprocating motion.

As can best be seen in FIG. 5, when the coolant is started, heat is extracted from the outer liquid mixture portion 73 directly through the conduit 18. That is to say, heat is transferred from the inner liquid mixture portion 71 through the wall of the conduit segment 66, through the outer liquid mixture portion 73 and finally through the wall of the conduit 18. Consequently, a large temperature drop will be created between the coolant coil 40 and the inner liquid mixture portion 71. The inner and outer agitator cages 74, 76 will, of course, be reciprocated to agitate the inner and outer liquid mixture portions 71, 73 to promote heat transfer therethrough. As the liquid mixture portion cools and approaches its freezing temperature, the outer liquid mixture portion 73 will be the first to freeze. As the outer liquid mixture portion becomes more viscous prior to freezing, the stroke of the outer agitator cage 76 will be reduced considerably even though the inner agitator cage 74 continues to agitate the inner liquid mixture portion 71. Further, the outer agitator cage 76 may be stopped completely due to the extremely high viscosity of the freezing mixture.

As is known, agitation of a liquid increases the rate of heat transfer therethrough. Consequently, it will readily be seen that heat transfer through the outer liquid mixture portion 73 will drop off considerably when agitation is slowed or stopped. Therefore, the rate of heat transfer between the coolant coil 40 and the inner liquid mixture portion 71 is reduced so that the inner liquid mixture portion 71 freezes last. More important, however, is the fact that the outer liquid mixture portion 73 acts as a variable resistance to heat transfer. Thus, when the outer liquid mixture portion 73 is near or at its freezing point, the heat transfer rate between the coolant and the inner liquid mixture portion is reduced. Hence, the inner liquid mixture portion 71 is cooled at a much slower rate, thereby inhibiting subcooling. Another important factor to note is that the use of inner and outer liquid mixture portions permits a rapid overall cooling of the liquid mixture to a temperature approximately equal to its freezing point and thereafter permits cooling of the inner mixture portion 71 at a slower rate.

It will be readily apparent that the thickness of the annular chamber 72 determines a range of freeze points over which the apparatus will operate satisfactorily, assuming that a fixed cooling media temperature is used. More specifically, the thickness of the annular chamber 72 is proportional to the range of freezing points over which it is desired to operate the apparatus. For example, the annular chamber 72 will have one thickness when the freezing point range is from 40–60° C. and will have a greater thickness when the freezing point range is from 40–90° C. The increase in thickness reduces the overall heat transfer rate so that this rate is not excessive at the higher freeze points. However, increasing the thickness of the annular chamber 72 results in a slower transfer rate at the lower freezing points. Consequently, the thickness of the annular chamber 72 should be set according to the freezing point range expected to be encountered.

Rate of change limit device 64

Reference is now directed to FIGS. 6–9 wherein the rate of change limit device 64 is illustrated. The device 64 comprises an elongated housing 100 provided with upper and lower end plates 102, 104 which close the opposite ends of the housing 100. Secured to and extending between the end plates 102, 104 are spaced parallel guide rods 106. A positioning rod 108 extends between and parallel to the guide rods 106 up through an opening 110 in the upper end plate 102. A support block 112 is secured transversely across the lower end of the positioning rod 108, and carries knife-edge elements 114 on its upper face. The support block 112 is provided with an extension rod 116 which is adapted to engage a stop 118 secured to the lower end plate 102. The stop 118 limits the downward travel of the positioning rod 108 and the support block 112. The elongated housing 100 is filled about halfway with an oil 120, shown in FIG. 7. A guide block 122, formed from electrically nonconducting material, is secured to the positioning rod 108 at a distance from the support block 112. The guide rods 106 extend through the guide block 122 and thereby guide the positioning rod 108 during its vertical reciprocal movement, as will be described.

A vane 124 is supported on the knife-edge elements 114 in a balanced condition and for pivotal movement about an imaginary line which connects the sharp edges of the knife-edge elements 114. The vane 124 is positioned transversely across the housing 100 and therefore, is positioned to resist movement through the oil 120. It is to be noted, that the vane 124 comprises side portions 126, 128 on opposite sides of the imaginary line, that is, on opposite sides of the knife-edge elements 114. The side portion 126 has a surface area which is greater than the surface area of the side portion 128. Consequently, when the positioning rod 108 is raised, the vane 124 pivots in a clockwise direction, as viewed in FIG. 7. Conversely, when the positioning rod 108 is lowered, the vane 124 will pivot about the knife-edge elements 114 in a counterclockwise direction as viewed in FIG. 7. The side portion 128 is provided with a rod 130. The side portion 126 is provided with a counterweight 132 whereby the vane 124 is balanced about the knife-edge elements 114.

Extending downwardly through the upper end plate 102 is a pair of electrodes 134, 136 whose ends comprise contacts 138, 140. The electrodes 134, 136 pass through a nonconducting block 142 carried by the guide block 122. Consequently, the electrodes 134, 136 are movable, in unison, with the positioning rod 108. Secured to the upper end of the positioning rod 108 is an alignment block 144. The electrodes 134, 136 extend upwardly through openings 146 in the upper end plate 102 and thence through openings in the alignment block 144. The electrodes are detachably connected to the alignment block 144 by means of nuts 148. That is to say, by loosening the nuts 148, the contacts 138 and 140 of the electrodes 134, 136 may be moved toward or away from the rod 130 of the vane 124. Secured to the extreme upper end of each of the electrodes 134, 136 is an inverted L-shaped aligning pin 150 which is received in a slot 152 formed in the alignment block 144. The aligning pins 150 in the slots 152 cooperate to maintain the contacts 138, 140 of the electrodes 134, 136 directly above and below the rod 130.

Figure 9:
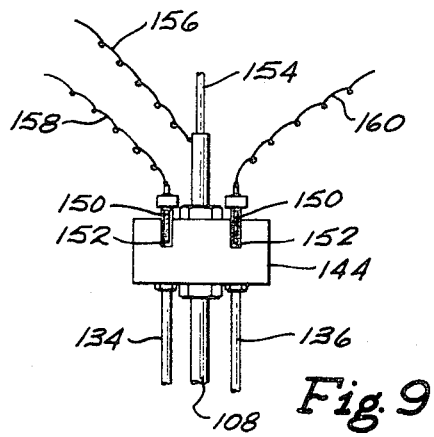
FIG. 9 is a side view of the upper alignment block.

A support wire 154 (FIGURES 7 and 9) is connected to the positioning rod 108 and adapts the rate of change limit device for connection, for example, to the shaft 54 of the temperature indicating device 50 of FIG. 1. That is to say, as the shaft 54 of the temperature indicating device 50 rotates, the positioning rod 108 will be moved longitudinally through the housing 100. Therefore, in accordance with the direction of rotation of the shaft 54 and consequently the direction of movement of the positioning rod 108, the vane 124 will pivot into engagement with either of the contacts 138, 140. It is to be noted at this time that as can be seen in FIG. 9, a conductor 156 is electrically connected to the positioning rod 108. Furthermore, electrical conductors 158, 160 are electrically connected to the electrodes 134, 136, respectively. It is also to be noted that the positioning rod 108, the support block 112, the knife-edge elements 114, the vane 124 and the rod 130 are formed from electrically conducting material and therefore serve as elements of an electric circuit. That is to say, current may flow through the conductor 156, the positioning rod 108, the support block 122, the knife-edge elements 114, the vane 124, the rod 130, and thence to either of the contacts 138 or 140 and the conductors 158, 160 associated therewith.

In operation, the vane 124 is balanced about the knife-edge elements 114 so that the rod 130 is spaced from the contact 138 by a predetermined distance as well as being spaced from the contact 140 by the same or a different predetermined distance. Furthermore, the surface areas of the side portions 126, 128 of the vane 124 are proportioned so that minute movement of the positioning rod 108 will cause the vane 124 to pivot into engagement with either of the contacts 138, 140. For example, when used in the freeze point determining apparatus 16 of the invention, the vane 124 is proportioned such that rotation of the shaft 54 of the temperature indicator device 50 at a velocity corresponding to 0.3° C. per minute will cause the vane 124 to be pivoted into engagement with the contact 138 when the temperature is decreasing and to be pivoted into engagement with the contact 140 when the temperature is increasing. It should also be evident that for a given surface area of the vane 124, the amount by which the vane 124 pivots about the knife-edge elements 114 is also dependent on the velocity at which the positioning rod 108 is moved through the oil 120. Consequently, by varying the spacing between the contacts 138, 140 and the rod 130, an effective change in the preselected rate of change can be accomplished.

It should be evident that rate of change limit devices other than the mechanically operated device 64 described above, may be employed.

*Operation and control circuit*

As is known, a cooling curve may be obtained by plotting the temperature of a liquid mixture as it is cooled versus time. There are three general types of cooling curves representative of three different types of liquid mixtures. In all liquid mixture types, however, the temperature will initially decrease at a fairly constant rate until the liquid mixture commences to freeze. At this point, several things may happen. In one case, the temperature may remain constant for a short period of time then continue to decrease. In another case, the liquid may be slightly subcooled whereupon the temperature will rise to the freezing point, remain constant for a short period of time, and then continue to fall. In the case of dilute solutions, the only indication of freezing is a change in the rate of cooling. The rate of change may be gradual or abrupt.

The apparatus of the invention is capable of determining the freezing point of liquid mixtures having any of the above-described cooling curves. Furthermore, as will now be described, the apparatus of the invention is capable in determining these freeze points in a rapid, automatic and continuous manner.

Figure 10:
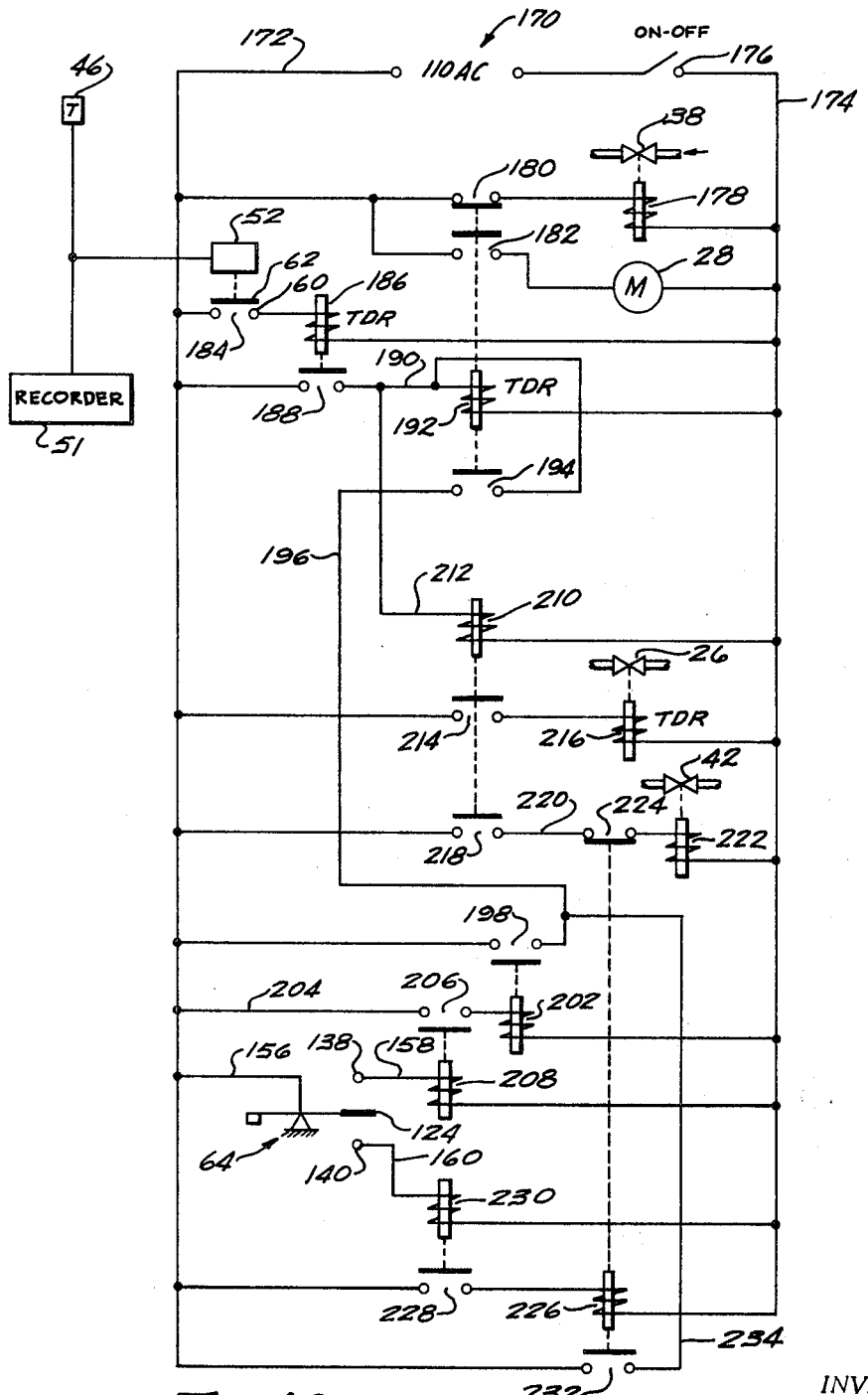
FIG. 10 is a circuit diagram illustrating the control elements for operating the freeze point determining apparatus of the invention.

Referring now to FIG. 10, a source 170 of 110-AC current is provided through conductors 172, 174, one of which incorporates a main on-off switch 176. The steam control valve 38 is operated by solenoid 178 through normally closed switch 180. The steam control valve 38 is of the normally closed type and when the main on-off switch 176 is closed, the solenoid 178 is energized to open the steam control valve 38. The motor 28 is connected across the main conductors 172, 174 and is operated by normally open switch 182.

The temperature probe 46 is connected to the drive mechanism 52 of the temperature indicating device 50 (FIG. 1) and the recording device 51. The contacts 60 and the wiper 62 of the drive mechanism 52, form a normally open switch 184 which controls a time delay relay 186. The time delay relay 186 operates a normally open switch 188 in conductor 190. The normally open switch 188, in turn, operates a second time delay relay 192 to which is ganged the normally closed switch 180, the normally open switch 182 and a normally open switch 194 provided in a conductor 196 leading from normally open contacts 198 to the conductor 190 between the normally open switch 188 and the time delay relay 192.

The normally open switch 198 is operated by a relay 202 which is energized through conductor 204 when a normally open switch 206 is closed. The switch 206 is operated by a relay 208, of the high impedance type, which is energized when the vane 124 engages the contact 138.

The normally open switch 188 also energizes a relay 210 through conductor 212. The relay 210 operates a normally open switch 214 for energizing a time delay relay 216 controlling the outlet valve 26, and a normally open switch 218 provided in a conductor 220 for energizing a relay 222 controlling the coolant valve 42.

A normally closed switch 224 is provided in the conductor 220. The switch 224 is operated by a relay 226 which is energized when a normally open switch 228 is closed. The switch 228 is operated by a relay 230, of the high impedance type, which is energized when the vane 124 engages the contact 140.

The relay 226 also operates a normally open switch 232 provided in a conductor 234 which is connected to the conductor 196 between the normally open switches 194 and 198.

Operation of the freezing point determining apparatus of the invention, will now be described with reference to the drawings. When the main on-off switch 176 is closed, the relay 178 is energized to open the valve 38, thereby admitting steam to the steam coil 36. Since the outlet valve 26 is normally open, liquid mixture flows into the conduit 18 filling the inner and annular chambers 70, 72. When the liquid mixture is heated to a preselected elevated temperature, as set by the relative positions of wiper 62 in the contacts 60, the normally open switch 184 of the device 52 is closed. At this time, the time delay relay 186 is energized closing the normally open switch 188. The time delay relay 192 and the relay 210 are then energized simultaneously.

Energization of the time delay relay 192 opens the switch 180 to stop the flow of steam, closes the normally open switch 182 to energize the motor 28 for agitating the liquid mixture, and closes the normally open switch 194.

Energization of the relay 210 closes the normally open switch 214 to close the outlet valve 26, and closes the normally open switch 218 to start the coolant flow.

Opening of the switch 188 is delayed by the time delay relay 186 for a period of, for example, about one minute. In this time interval, the liquid mixture begins to cool whereupon the vane 124 of the rate of change limit device 64, engages contact 138 to energize the relay 208, thereby closing the normally open switch 206. At this time, current is supplied to the relay 202 to close normally open switch 198, thereby supplying current to time delay relay 192 and the relay 210 through the conductors 196, 190 and 212. The liquid mixture in the conduit 18 is cooled and is continuously agitated.

When the outer liquid mixture portion 73 becomes viscous and begins to freeze, the stroke of the outer agitating cage 76 is reduced. The rate of heat transfer between the coolant coil 40 and the inner liquid mixture portion 71 is greatly reduced. When the inner liquid mixture portion 71 approaches its freezing point, it becomes viscous and may hinder the stroke of the inner agitating cage 74. The rate of change in the decreasing temperature of the inner liquid mixture portion 71 is also reduced.

When the rate of temperature change falls below the preselected rate of temperature change, the vane 124 disengages from the contact 138, thereby deenergizing the relays 208 and 202 so that current ceases to flow to the time delay relay 192 and the relay 210. The time delay relay 192 maintains the switch 180 open and the switches 182 and 194 closed for a period of about thirty seconds. Deenergization of the relay 210 opens the switches 214 and 218, whereby the relay 222 is deenergized to close the coolant control valve 42 and stop the flow of coolant. The time delay relay 216 is also deenergized, however, the outlet valve 26 remains closed for a period of about thirty seconds.

At this time, two things may happen. First, the temperature of the inner liquid mixture portion 71 may remain constant and comprise the freezing point of the liquid mixture. Second, the temperature of the inner liquid mixture portion 71 may start to rise indicating that the portion 71 has been slightly subcooled and that the freezing temperature is actually a second temperature above this lower temperature.

In the first case, that is, wherein the temperature remains constant, the vane 124 will remain disengaged from the contact 138 and the time delay relays 192 and 216 will drop out. This temperature is the freezing point of the liquid mixture. This temperature is indicated by the pointer 56 and is recorded by the recording device 51. When the time delay relay 192 drops out, the switch 180 is closed to again energize the relay 178 admitting steam to the steam coils 38, the switch 182 is opened to deenergize the motor 28. The switch 194 is also opened, thereby deactivating the contact 138 so that no current will flow to the time delay relays 192 and 210 when the vane 124 engages the contact 140 as the liquid mixture portion is being heated to the preselected elevated temperature.

When the relay 216 drops out, the outlet valve 26 opens so that the previously frozen liquid mixture, when liquid, flows into the vertical section 14 of the process line 10 while new liquid mixture sample is admitted into the conduit 18 through the horizontal section 12 of the process pipe 10. Thereafter, the above-described cycle is repeated to determine a freezing point of a new sample of liquid mixture admitted into the conduit 18.

In the second case, that is, wherein the temperature of the inner liquid mixture portion 71 begins to rise, the vane 124 will be displaced into engagement with the contact 140. The relays 230 and 226 are then energized to supply current to the time delay relay 192 and the relay 210 through conductors 234, 196, 190 and 212. It is to be noted that the switch 194 remains closed by the delay provided by the relay 192. Energization of relay 226 also causes opening of the normally closed switch 224 whereby the relay 222 remains deenergized so that the coolant control valve 42 is closed. The time delay relay 192 and the relay 210 will remain energized until the rate of change in the increasing temperature of the inner liquid mixture portion 71 falls below the preselected rate of temperature change. At this time, the vane 124 will move away from the contact 140, thereby stopping current flow to the relays 230 and 226, and hence to the time delay relay 192 and the relay 210. The temperature will now stabilize at the freezing point of the liquid mixture which temperature is indicated by the pointer 56 and recorded by the recorder 51. After the interval of about thirty seconds, the time delay relays 192 and 216 will drop out, whereupon steam will be admitted into the conduit 18, the motor 28 will be deenergized, and the outlet valve 26 will be opened. The cycle is then automatically repeated to determine the freezing point of the next liquid mixture sample.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. In apparatus for determining the freezing point of a liquid mixture, the combination comprising: a vessel having a first chamber and a second chamber with walls in abutment with each other; means for introducing a quantity of the liquid mixture whose freezing point is to be determined into both of said first and second chambers; means for measuring the temperature of the liquid mixture portion in said first chamber; and means for cooling said quantity of liquid mixture to its freezing point by extraction of heat directly from the liquid mixture portion in said second chamber whereby heat from the liquid mixture portion in said first chamber flows through the liquid mixture portion in said second chamber.

2. The apparatus as defined in claim 1 including means for independently agitating the liquid mixture portions in said first and second chambers during cooling.

3. The apparatus as defined in claim 1 including means responsive to a preselected rate of temperature change in the liquid mixture portion in said first chamber for deactivating said cooling means as the temperature of the liquid mixture portion in said first chamber approaches its freezing point.

4. The apparatus as defined in claim 3 including recording means responsive to said temperature measuring means for recording the temperature of said liquid mixture within said first chamber, and wherein said means responsive to a preselected rate of change in the temperature of said liquid mixture comprises: an elongated housing having a longitudinal axis; end plates closing the opposite ends of said housing; a liquid within said housing; a vane positioned to resist movement through said liquid; means for supporting said vane in a balanced condition when stationary and for pivotal movement about an imaginary line normal to said longitudinal axis; said vane and said vane supporting means being movable through said liquid; an electrode movable in unison with said vane and having an end positioned to be contacted by said vane; circuit means including said vane and said electrode for controlling the operation of said cooling means; and means for operatively connecting said vane supporting means to said recording means for moving said vane and said electrode at velocities corresponding to the rate of change in the temperature of said liquid mixture, whereby as said liquid mixture is cooled and the rate of change in the liquid mixture temperature exceeds a preselected rate of temperature change said vane remains engaged with said electrode, and as the temperature of said liquid mixture approaches the freezing temperature and the rate of change in the liquid mixture temperature falls below said preselected rate of temperature change said vane is disengaged from said electrode to open said circuit and deactivate said cooling means.

5. Apparatus for determining the freezing point of a liquid mixture flowing through a process line, comprising in combination: a first conduit communicating with said process line at spaced upstream and downstream locations therein; a conduit segment within said first conduit, said conduit segment dividing the interior of said first conduit into an inner chamber and an annular chamber surrounding said inner chamber; valve means in said first conduit for controlling the flow of said liquid mixture from said process line through said inner chamber and said annular chamber; means for measuring the temperature of the liquid mixture portion within said inner chamber; means for cooling the liquid mixture to its freezing point by extracting heat directly from the liquid mixture portion in said first conduit; and circuit means including means responsive to a preselected temperature of said liquid mixture for closing said valve means and activating said cooling means to cool the liquid mixture to its freezing temperature and means responsive to a preselected rate of change in the decreasing temperature of the liquid mixture in said inner chamber for deactivating said cooling means.

6. The apparatus as defined in claim 5 including means for independently agitating the liquid mixture portions in said inner chamber and said annular chamber during cooling, and means included in said circuit means for activating said agitating means when the temperature of said liquid mixture is substantially equal to said preselected temperature.

7. The apparatus as defined in claim 5 including means for heating said liquid mixture, and means included in said circuit means for deactivating said heating means when the temperature of said liquid mixture is substantially equal to said preselected temperature.

8. Apparatus for determining the freezing point of a liquid mixture flowing through a process line, comprising in combination: a first conduit communicating with the interior of said process line at spaced upstream and downstream positions thereon; a conduit segment within said first conduit, said conduit segment dividing the interior of said first conduit into an inner chamber and an annular chamber which surrounds said inner chamber; means for measuring the temperature of the liquid mixture portion within said inner chamber; valve means in said first conduit for controlling the flow of liquid mixture from said process line through said inner chamber and said outer chamber; means surrounding said first conduit for heating the liquid mixture therein; means extending into said inner chamber and said annular chamber for independently agitating the liquid mixture portions therein; means surrounding said first conduit for cooling the liquid mixture by extraction of heat directly from said first conduit whereby the liquid mixture portion in said annular chamber freezes before the liquid mixture portion in said inner chamber; circuit means including means for activating said heating means to heat said liquid mixture to a preselected elevated temperature, and means responsive to said preselected elevated temperature for closing said valve means, deactivating said heating means and activating said agitating means and said cooling means whereby the liquid mixture trapped within said inner chamber and said annular chamber is rapidly cooled to its freezing point; and means responsive to a preselected rate of change in the decreasing temperature of said liquid mixture for deactivating said cooling means as the temperature of said liquid mixture approaches its freezing point.

References Cited

UNITED STATES PATENTS

| 3,150,515 | 9/1964 | Malina | 73—17 |
| 3,250,115 | 5/1966 | Donnell | 73—17 |

FOREIGN PATENTS

| 96,982 | 1961 | Netherlands. |

JAMES J. GILL, *Primary Examiner.*

HERBERT GOLDSTEIN, *Assistant Examiner.*